(No Model.)
S. C. KETCHUM.
BOBBIN REAMER.
No. 353,864. Patented Dec. 7, 1886.
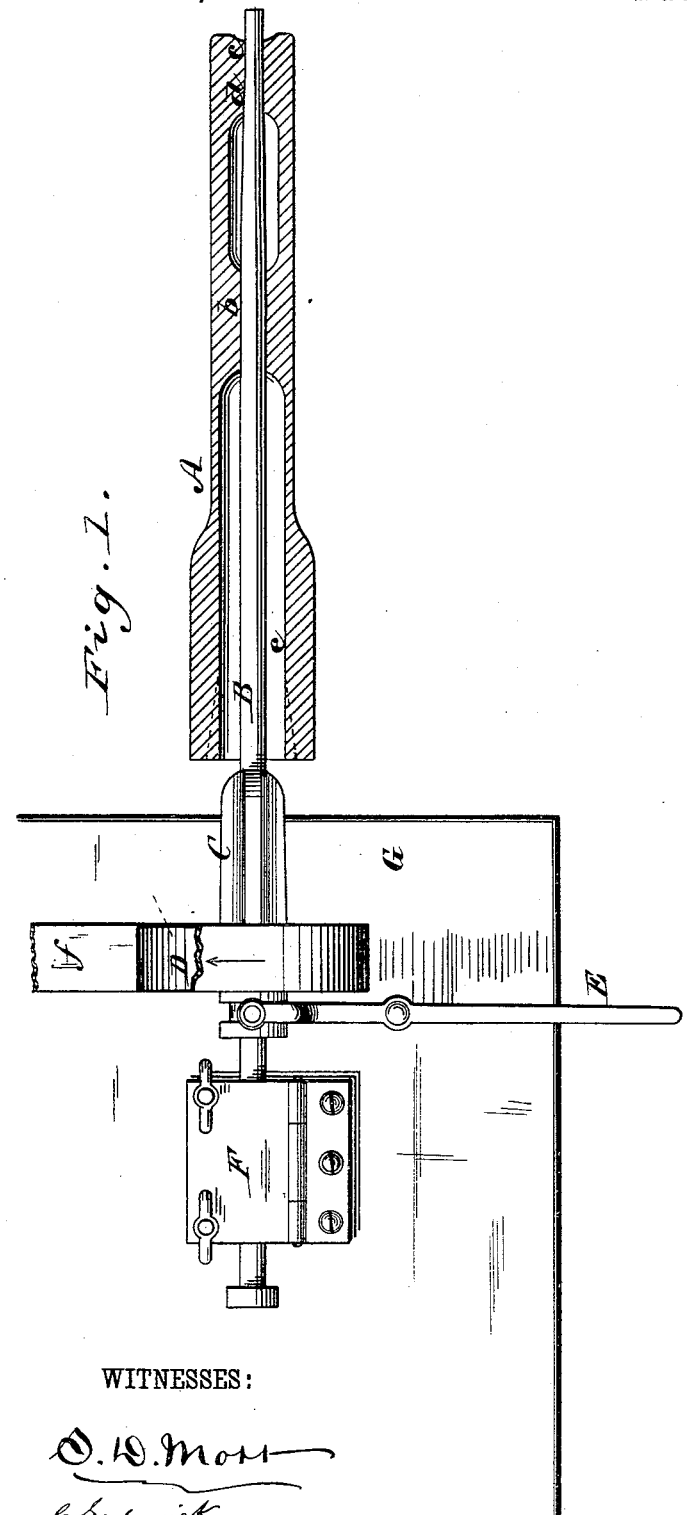
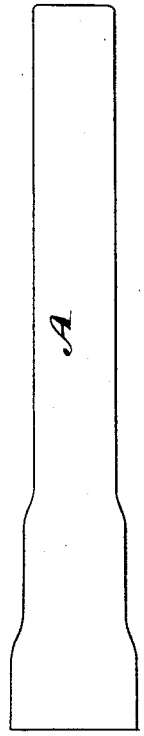
WITNESSES:
INVENTOR:
S. C. Ketchum
BY Munn & Co.
ATTORNEYS.

UNITED STATES PATENT OFFICE.

STEPHEN C. KETCHUM, OF WINCHENDON, MASSACHUSETTS.

BOBBIN-REAMER.

SPECIFICATION forming part of Letters Patent No. 353,864, dated December 7, 1886.

Application filed April 2, 1886. Serial No. 197,550. (No model.)

*To all whom it may concern:*

Be it known that I, STEPHEN C. KETCHUM, of Winchendon, in the county of Worcester and State of Massachusetts, have invented certain new and useful Improvements in Reaming-Tools for Bobbins of Spinning, &c., Frames, of which the following is a full, clear, and exact description.

This invention has for its object the more perfect reaming of bobbins for spinning, or spinning and twisting frames, so that the bobbins may not only be turned true, but will run true when in position upon the spindles which carry them.

The invention is applied to all such bobbins, regardless of the number or shapes of their interior upper bearings, which may, for instance, consist of two straight surface-bearings and one tapering bearing, or one tapering bearing only; but in every case such bearing or bearings have combined with them an enlarged interior lower bearing at the base or large end of the bobbin. This enlarged interior lower bearing is usually reamed out after the upper bearing or bearings have been reamed, and great difficulty has been experienced in getting such interior lower bearing true or in line with the upper bearing or bearings.

My invention consists in a special tool or means for the purpose, the same including a centering-spindle adapted to accurately and closely fit the interior upper bearing or bearings, and a special rotating and longitudinally-traversing reamer arranged to revolve and travel backward and forward upon or along said spindle for reaming out the enlarged interior base-bearing of the bobbin.

Reference is to be had to the accompanying drawings, forming part of this specification, in which similar letters of reference indicate corresponding parts in both the figures.

Figure 1 represents a plan view of my improved reaming device as applied to a bobbin in the rough, and Fig. 2 a longitudinal view of the finished bobbin.

The bobbin A in the drawings is represented as having two upper interior straight surface-bearings, *b c*, and a tapering bearing, *d*, or continuation of the bearing *c*. It also has the usual lower interior and larger bearing, *e*, which it is necessary, in order to make a perfect bobbin, should be in exact line or coincident with the above-named or other upper bearing or bearings, and which it is requisite to ream out at its outer end, as shown in dotted lines, Fig. 1, after the upper bearings have been reamed or finished. If said lower bearing is not in line with the upper bearings, then the bobbin cannot be run true in the lathe to dress its exterior from the rough condition, as it is shown in Fig. 1, to the finished condition, represented in Fig. 2, and the bobbin, when in place on the spindle of the spinning-frame, &c., will wabble or run out of truth, thereby endangering the breakage of thread, &c. To obviate this, I secure at or near its rear end a dead-spindle, B, within a clamping-box or divided block, F, mounted upon a bench, G, and so that the forward and main portion of said spindle projects beyond the bench. This dead-spindle B is constructed to form a close fit within the upper bearing or bearings of the bobbin A, which is slipped or driven to its place on the spindle from its forward end, the base of the bobbin being toward the bench.

Upon the rear portion of the spindle, in front of the box F, is fitted a pulley, D, having an attached hollow reamer, C, arranged to project from the central portion of its face, and adapted to ream out the lower interior bearing, *e*, of the bobbin at its outer end, as before stated, for which purpose the pulley D, which may be driven by a belt, *f*, and the attached reamer C, which may be of any suitable construction on its cutting-edges, are both free not only to rotate upon the spindle B, carrying the bobbin, but also to be worked backward and forward, as by a lever, E, along said spindle, whereby the lower bearing, *e*, in the bobbin will be necessarily reamed out in perfect axial line with the bearing or bearings in the upper portion of the bobbin. The pulley has a collar in line with the reamer, and this collar has an annular groove, into which extend inward-projecting pins or lugs on the end of the lever, which pins play freely in the groove.

It should be observed that, as usual, the enlarged interior lower bearing, *e*, of the bobbin only requires to extend a short distance up within the bobbin, as shown in dotted lines in Fig. 1; hence the reamer C and the traversing motion of the pulley D, with its attached reamer, are only of length to suit. The sliding movement of the driving-belt $f$ may be provided for as usual in other sliding-driving belt and pulley arrangements. The bobbin A is supported upon the dead-spindle B by driving it thereon, or it may be held on by hand while the bearing $e$ is being reamed. To obtain the necessary result, it is all important, however, that the dead-spindle B should fit the upper inner bearing or bearings of the bobbin, and the reamer C, with its attached pulley, should turn upon and travel along the same spindle, otherwise the bearing $e$ will not be reamed out true with the upper inner bobbin-bearings.

Having thus described my invention, what I claim as new, and desire to secure by Letters Patent, is—

1. The means, substantially as herein described, for reaming the lower interior bearing of the bobbin to make it coincident or in line with the upper interior bearing or bearings thereof, the same consisting of a centering and reamer-carrying spindle adapted to fit the upper bearing or bearings of the bobbin, and a reamer adapted to ream the lower interior bearing of the bobbin, and arranged to rotate upon said spindle and having a traversing motion backward and forward along it, as herein set forth.

2. In a tool for reaming the interior base-bearings of bobbins of spinning and other like frames, the combination of the spindle B, the reamer C, and the pulley D, attached to or carrying said reamer, and fitted to rotate and slide upon said spindle, for application to the bobbin to be reamed, substantially as specified.

3. The combination of the lever E, the pulley D, the reamer C, attached to or carried by said pulley, and the spindle B, adapted to admit of said united pulley and reamer rotating freely upon and sliding along it, essentially as and for the purpose herein set forth.

STEPHEN C. KETCHUM.

Witnesses:
A. GREGORY,
C. SEDGWICK.